US012583484B2

(12) United States Patent
Kuehner et al.

(10) Patent No.: US 12,583,484 B2
(45) Date of Patent: Mar. 24, 2026

(54) SYSTEMS AND METHODS FOR PROVIDING POST-TAKEOVER COMPLEXITY

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 365 days.

(21) Appl. No.: 18/169,088

(22) Filed: Feb. 14, 2023

(65) Prior Publication Data

US 2024/0270287 A1    Aug. 15, 2024

(51) Int. Cl.
B60W 50/14          (2020.01)
B60W 60/00          (2020.01)

(52) U.S. Cl.
CPC ........ B60W 60/0053 (2020.02); B60W 50/14 (2013.01); B60W 2520/10 (2013.01); B60W 2552/05 (2020.02); B60W 2552/10 (2020.02); B60W 2554/40 (2020.02); B60W 2555/20 (2020.02); B60W 2555/60 (2020.02)

(58) Field of Classification Search
CPC ............ B60W 60/0053; B60W 50/14; B60W 2555/20; B60W 2555/60; B60W 2554/40; B60W 2552/05; B60W 2552/10; B60W 2520/10
USPC .......................................... 701/23
See application file for complete search history.

(56) References Cited

U.S. PATENT DOCUMENTS

| | | |
|---|---|---|
| 11,046,332 B2 | 6/2021 | Akaba et al. |
| 11,351,989 B2 | 6/2022 | Yoo et al. |
| 2020/0164895 A1* | 5/2020 | Boss ................. B60W 60/0053 |
| 2021/0031807 A1* | 2/2021 | Yamamoto ............ B60W 50/14 |
| 2021/0086796 A1 | 3/2021 | Yamasaki |
| 2021/0107498 A1* | 4/2021 | Liu ................... B60W 60/0053 |
| 2021/0364307 A1 | 11/2021 | Kracun et al. |
| 2022/0001888 A1 | 1/2022 | Hashimoto et al. |
| 2022/0169289 A1 | 6/2022 | Bauer et al. |
| 2022/0306115 A1* | 9/2022 | Harada ................ G06V 20/588 |
| 2022/0306162 A1 | 9/2022 | Kawano et al. |

FOREIGN PATENT DOCUMENTS

| | | |
|---|---|---|
| CN | 112124327 A | 12/2020 |
| CN | 113286984 A | 8/2021 |
| CN | 114162143 A | 3/2022 |
| DE | 102016116860 A1 | 3/2018 |
| EP | 3947081 A1 | 2/2022 |
| WO | 2022050108 A1 | 3/2022 |

* cited by examiner

*Primary Examiner* — Adam D Tissot
(74) *Attorney, Agent, or Firm* — Christopher G. Darrow; Darrow Mustafa PC

(57) ABSTRACT

System, methods, and other embodiments described herein relate to providing post-takeover complexity. In one embodiment, a method includes receiving a potential disengagement event; determining a takeover location based on the potential disengagement event; determining a post-takeover complexity measure based on the takeover location; and generating a notification based on the post-takeover complexity measure.

20 Claims, 7 Drawing Sheets

700

WARNING:
SHARP TURN IN 1 MILE
REDUCE SPEED TO 40 MPH

PLEASE RESUME MANUAL CONTROL

600

Receiving a potential disengagement event

610

Determining a default takeover location based on
the potential disengagement event

620

Determining a preferred takeover location prior to
the default takeover location

630

Generating a takeover request at the preferred
takeover location

640

700

Receiving a potential disengagement event
710

Determining a takeover location based on the
potential disengagement event
720

Determining a post-takeover complexity measure
based on the takeover location
730

Generating a notification based on the post-takeover
complexity measure
740

SYSTEMS AND METHODS FOR PROVIDING POST-TAKEOVER COMPLEXITY

CROSS-REFERENCE TO RELATED APPLICATIONS

This application claims benefit of U.S. Non-Provisional application Ser. No. 18/169,088, filed on Feb. 14, 2023, which is herein incorporated by reference in its entirety.

TECHNICAL FIELD

The subject matter described herein relates, in general, to takeover requests, and, more particularly, to implementing low complexity takeover request locations as well as providing post-takeover complexity notifications.

BACKGROUND

Vehicles may be equipped with automated driving assistance systems. The specific operating domain(s) in which an automated driving assistance system is designed to properly operate, which may be defined with respect roadway types, speed range, environmental conditions (weather, daytime/nighttime, etc.), or other constraints, may be referred to as an operational design domain. If an automated driving assistance system detects an exit from its operational design domain, the automated driving assistance system typically makes a takeover request to the vehicle operator, after which the vehicle operator is expected to take manual control of the vehicle.

SUMMARY

In one embodiment, example systems and methods relate to a manner for providing post-takeover complexity.

In one embodiment, a takeover evaluator system is disclosed. The takeover evaluator system includes one or more processors and a memory communicably coupled to the one or more processors. The memory stores a command module including instructions that when executed by the one or more processors cause the one or more processors to receive a potential disengagement event; determine a takeover location based on the potential disengagement event; determine a post-takeover complexity measure based on the takeover location; and generate a notification based on the post-takeover complexity measure.

In one embodiment, a non-transitory computer-readable medium including instructions that when executed by one or more processors cause the one or more processors to perform one or more functions is disclosed. The instructions include instructions to receive a potential disengagement event; determine a takeover location based on the potential disengagement event; determine a post-takeover complexity measure based on the takeover location; and generate a notification based on the post-takeover complexity measure.

In one embodiment, a method for evaluating takeover complexity is disclosed. In one embodiment, the method includes receiving a potential disengagement event; determining a takeover location based on the potential disengagement event; determining a post-takeover complexity measure based on the takeover location; and generating a notification based on the post-takeover complexity measure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with evaluating takeover complexity are disclosed herein. When automated driving assistance encounters a situation defining the edge of its operational design domain, a takeover request may be generated at a location without regard to the complexity of the surrounding environment. For example, the takeover request may be issued solely with respect to a time before reaching an operational design domain boundary.

As an alternative to or a supplement to the traditional takeover process, approaches for implementing low complexity takeover request locations, which may be provided prior to a default takeover location, are described herein. Such preferred takeover locations are likely to provide a low complexity environment for vehicle operators to respond to takeover requests. For example, a vehicle may determine a preferred takeover location based on criteria or measures of complexity involving speed limits, average vehicle speeds, number of lanes, road type, road geometry, intersection type, traffic signal operations, traffic conditions, weather conditions, road conditions, or other factors. Such preferred takeover locations may then be used to issue takeover requests to the vehicle operator prior to a default takeover that may be required at the operational design domain boundary. In addition, since a low complexity takeover request location may nonetheless be followed by a high complexity environment, approaches are described herein for post-takeover complexity notifications. Such post-takeover complexity notifications may be used indicate to a vehicle operator the expected complexity of the operating environment after a takeover occurs and may further include post-takeover instructions on how to handle the expected complexity.

Figure 1:
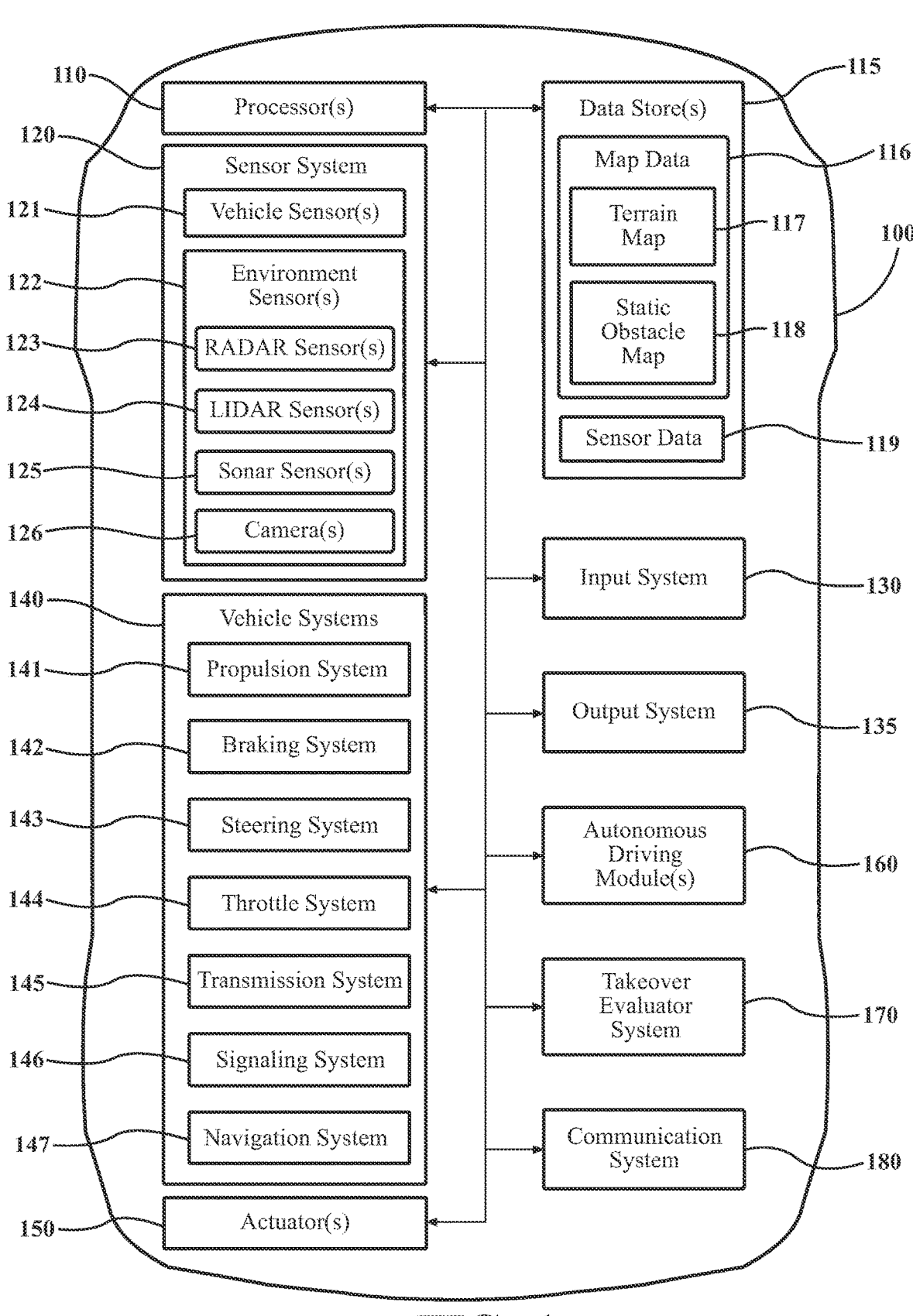
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with implementing low complexity takeover request locations or providing post-takeover complexity. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a takeover evaluator system 170 that is implemented to perform methods and other functions as disclosed herein relating to evaluating takeover complexity. As will be discussed in greater detail subsequently, the takeover evaluator system 170, in various embodiments, is implemented partially within the vehicle 100, and as a cloud-based service. For example, in one approach, functionality associated with at least one module of the takeover evaluator system 170 is implemented within the vehicle 100 while further functionality is implemented within a cloud-based computing system.

Figure 2:
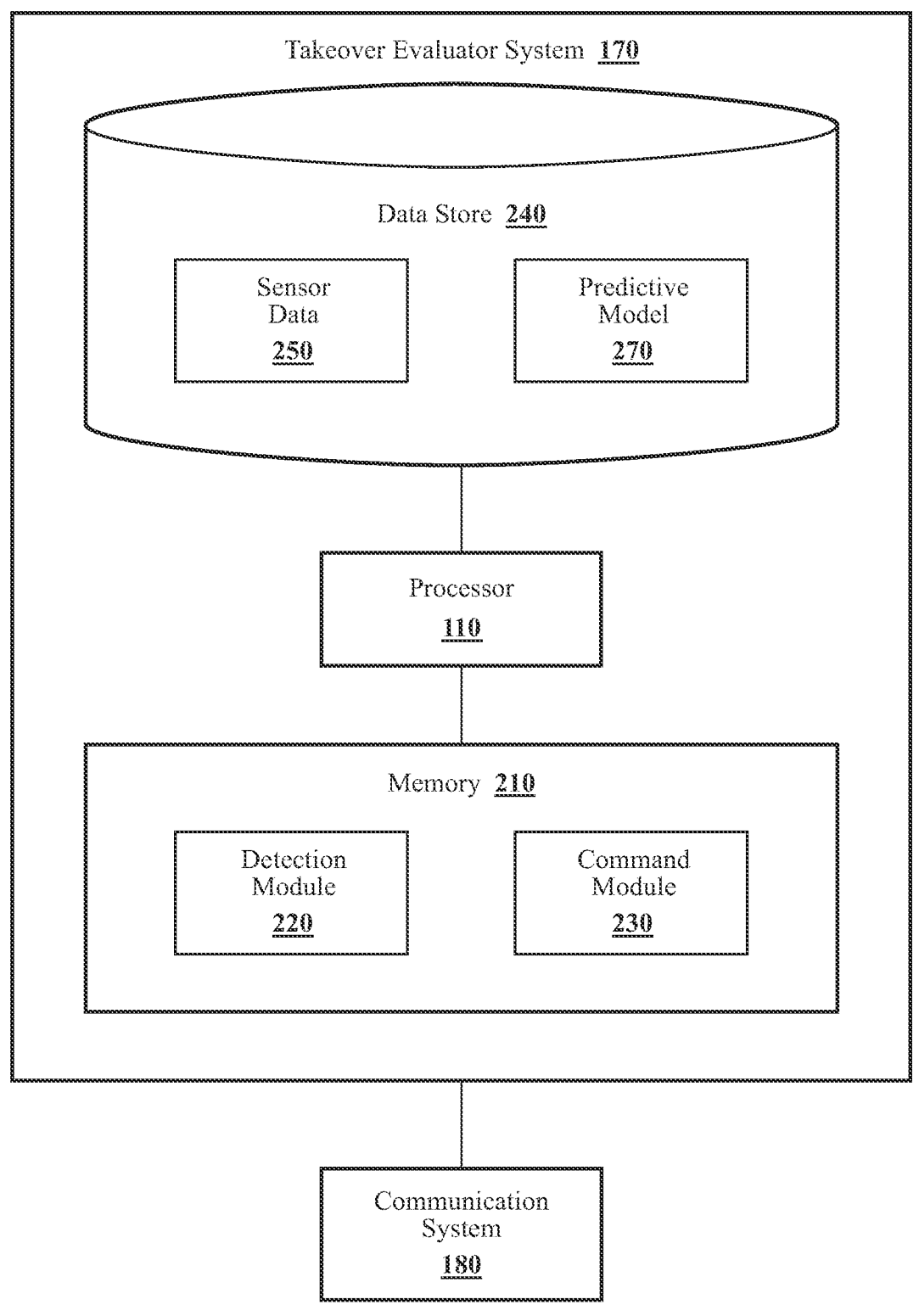
FIG. 2 illustrates one embodiment of a takeover evaluator system that is associated with evaluating takeover complexity.

With reference to FIG. 2, one embodiment of the takeover evaluator system 170 of FIG. 1 is further illustrated. The takeover evaluator system 170 is shown as including a processor 110 from the vehicle 100 of FIG. 1. Accordingly, the processor 110 may be a part of the takeover evaluator system 170, the takeover evaluator system 170 may include a separate processor from the processor 110 of the vehicle 100, or the takeover evaluator system 170 may access the processor 110 through a data bus or another communication path. In one embodiment, the takeover evaluator system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
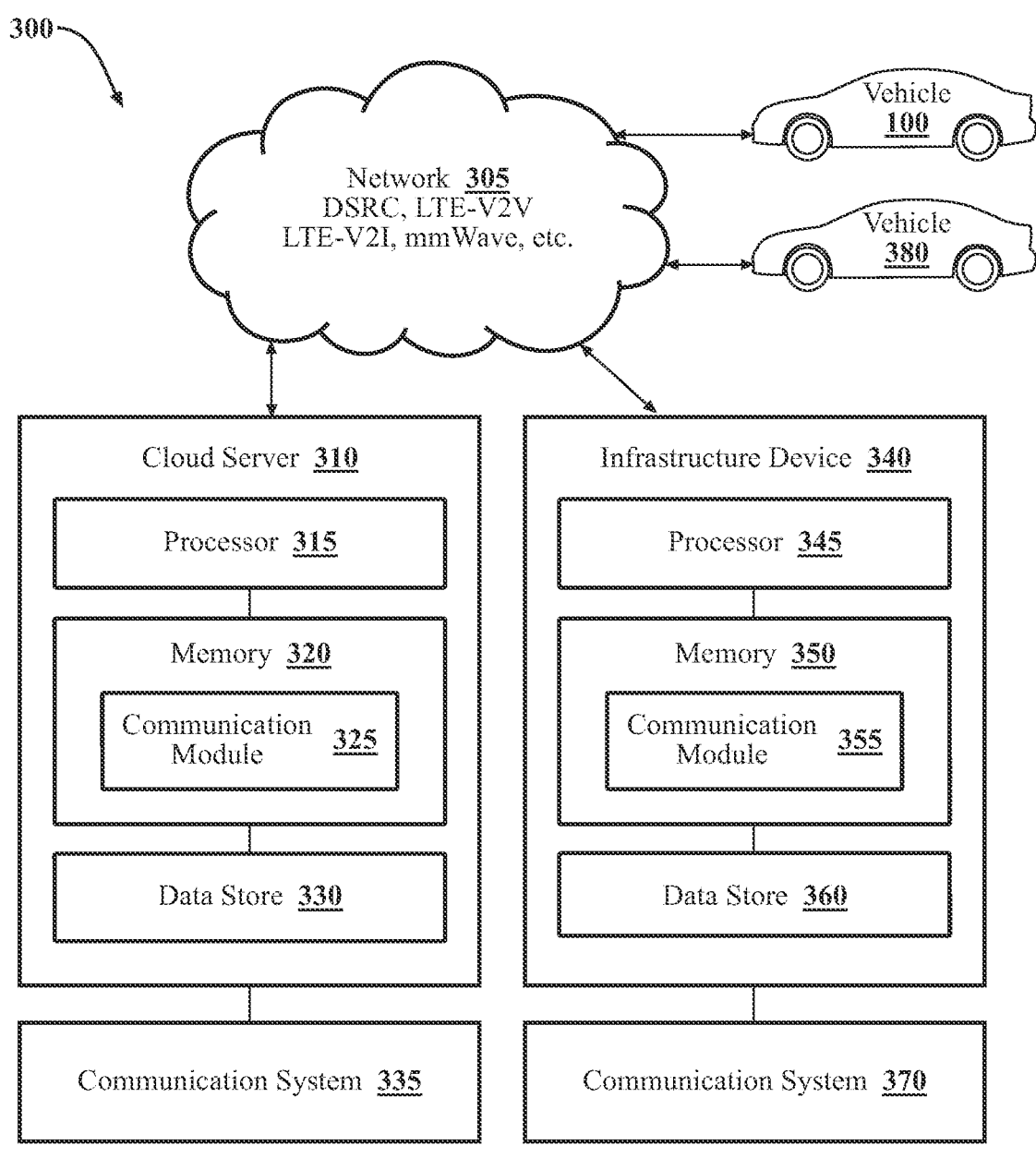
FIG. 3 illustrates one embodiment of the takeover evaluator system of FIG. 2 in a cloud-computing environment.

The takeover evaluator system 170 as illustrated in FIG. 2 is generally an abstracted form of the takeover evaluator system 170 as may be implemented between the vehicle 100 and a cloud-computing environment. FIG. 3, which is further described below, illustrates one example of a cloud-computing environment 300 that may be implemented along with the takeover evaluator system 170. As illustrated in FIG. 3, the takeover evaluator system 170 may be embodied at least in part within the cloud-computing environment 300.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a LiDAR 124, and other sensors as may be suitable for identifying vehicles and locations of the vehicles. In one embodiment, detection module 220 may also acquire sensor data 250 from one or more sensors that allow for estimating takeover complexity.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the takeover evaluator system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

The detection module 220, in one embodiment, is further configured to perform additional tasks beyond controlling the respective sensors to acquire and provide the sensor data 250. For example, the detection module 220 includes instructions that cause the processor 110 to detect potential disengagements based on sensor data 250. For example, detection module 220 may use sensor data 250 to determine the boundaries of any operational design domain where automated driving assistance would be disabled.

In one embodiment, the command module 230 generally includes instructions that function to control the processor 110 or collection of processors in the cloud-computing environment 300 for evaluating takeover complexity.

In some embodiments, command module 230 may receive a potential disengagement event, where a vehicle operator may need to take over operation of the vehicle. Such a potential disengagement event may further include information as to the expected location of the potential disengagement. In some embodiments, command module 230 may receive from detection module 220 a notification of a potential disengagement event ahead of the vehicle. In some embodiments, command module 230 may receive a potential disengagement event based on map data 116, such as where map data 116 specifies areas limiting or prohibiting automated driving assistance. In some embodiments, command module 230 may receive a potential disengagement event via network 305.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

The cloud server 310 is shown as including a processor 315 that may be a part of the takeover evaluator system 170 through network 305 via communication unit 335. In one embodiment, the cloud server 310 includes a memory 320 that stores a communication module 325. The memory 320 is a random-access memory (RAM), read-only memory (ROM), a hard-disk drive, a flash memory, or other suitable memory for storing the module 325. The module 325 is, for example, computer-readable instructions that when executed by the processor 315 cause the processor 315 to perform the various functions disclosed herein. Moreover, in one embodiment, cloud server 310 includes the database 330. The database 330 is, in one embodiment, an electronic data structure stored in the memory 320 or another data store and that is configured with routines that can be executed by the processor 315 for analyzing stored data, providing stored data, organizing stored data, and so on.

The infrastructure device 340 is shown as including a processor 345 that may be a part of the takeover evaluator system 170 through network 305 via communication unit 370. In one embodiment, the infrastructure device 340 includes a memory 350 that stores a communication module 355. The memory 350 is a random-access memory (RAM), read-only memory (ROM), a hard-disk drive, a flash memory, or other suitable memory for storing the module 355. The module 355 is, for example, computer-readable instructions that when executed by the processor 345 cause the processor 345 to perform the various functions disclosed herein. Moreover, in one embodiment, infrastructure device 340 includes the database 360. The database 360 is, in one embodiment, an electronic data structure stored in the memory 350 or another data store and that is configured with routines that can be executed by the processor 345 for analyzing stored data, providing stored data, organizing stored data, and so on.

Accordingly, in addition to information obtained from sensor data 250, takeover evaluator system 170 may obtain information from cloud servers (e.g., cloud server 310), infrastructure devices (e.g., infrastructure device 340), other vehicles (e.g., vehicle 380), and any other systems connected to network 305.

In some embodiments, command module 230 may receive a potential disengagement event based on weather conditions, such as where expected fog, rain, or snow at a location ahead may likely cause difficulties with camera-based automated driving assistance. In some embodiments, command module 230 may receive a potential disengagement event based on traffic conditions, such as where expected traffic congestion at a location ahead may impair the ability to provide automated driving assistance. In some embodiments, command module 230 may receive a potential disengagement event based on the vehicle being predicted to exit an operational design domain. In some embodiments, command module 230 may receive a potential disengagement event based on time, such as when sunset or sunrise may occur, and calculate a location where the disengagement is expected to occur based on vehicle parameters, traffic data, or other factors.

In some embodiments, command module 230 may determine a default takeover location (where a takeover request may be generated) based on a potential disengagement event. For example, based on the potential disengagement event, command module 230 may determine where the default takeover location should occur (e.g., so as to satisfy a minimum required amount of time for allowing a takeover to occur after a takeover request and prior to a potential disengagement). In some embodiments, the default takeover location may be established with respect to a reference point and a specific amount of time in relation to encountering the reference point (e.g., 15 seconds before point A, 10 seconds after point B). In some embodiments, command module 230 may adjust the default takeover location, including the location of a reference point or the specific amount of time in relation to the reference point, based on vehicle speed or other vehicle parameters, including vehicle estimates of operator vigilance. In some embodiments, the default takeover location may be adjusted based on vehicle speed to ensure sufficient time for a takeover process to complete prior to a potential disengagement. In some embodiments, command module 230 may determine a default takeover location only if the vehicle operator fails to properly respond to a takeover request associated with a preferred takeover location. In some embodiments, a default takeover location may be determined in the same manner as a preferred takeover location.

In some embodiments, command module 230 may determine a preferred takeover location. A preferred takeover location may offer a vehicle operator a low complexity environment in which to respond to a takeover request.

In some embodiments, command module 230 may determine a takeover complexity measure based on speed limits or average vehicle speeds after a takeover location according to one or more criteria (e.g., under 30 mph, low speed, high speed). In some embodiments, command module 230 may determine a takeover complexity measure based on the number of lanes or changes in the number of lanes after a takeover location according to one or more criteria (e.g., two lane road, increase in lanes by one, decreased in lanes by one). In one embodiment, command module 230 may determine a takeover complexity measure based on road type after a takeover location according to one or more criteria (e.g., one-way roads, limited-access roads). In one embodiment, command module 230 may determine a takeover complexity measure based on road geometry after a takeover location according to one or more criteria (e.g., no curve, simple circular curve, compound curve, reverse curve, track transition curve, spiral curve, valley/sag curve, summit curve). In one embodiment, command module 230 may determine a takeover complexity measure based on intersection type after a takeover location according to one or more criteria (e.g., yield, four-way stop, signal-controlled intersection, traffic circle, roundabout). In one embodiment, command module 230 may determine a takeover complexity measure based on traffic control operations after a takeover location according to one or more criteria (e.g., speed camera, red light camera). In one embodiment, command module 230 may determine a takeover complexity measure based on traffic conditions after a takeover location according to one or more criteria (e.g., light traffic, heavy traffic, stop and go traffic). In one embodiment, command module 230 may determine a takeover complexity measure based on weather conditions after a takeover location according to one or more criteria (e.g., light rain, snow). In one embodiment, command module 230 may determine a takeover complexity measure based on road conditions after the takeover location according to one or more criteria (e.g., asphalt road, gravel road, unplowed road).

In some embodiments, a takeover complexity measure may be measured in terms of categorization. For example, the takeover complexity of a segment of road may be characterized as "low speed", "two-lane", and "no curve". In some embodiments, a takeover complexity measure may be characterized according to a ranking of the criteria in terms of difficulty (e.g., a low speed limit may have a lower rank than a high speed limit, a straight road may have a lower rank than a curved road).

In some embodiments, command module 230 may implement a complexity scoring system to determine a takeover complexity measure. Such a complexity scoring system may have one or more criteria for evaluating a takeover complexity measure with respect to speed limits, average vehicle speeds, number of lanes, road type, road geometry, intersection type, traffic control operations, traffic conditions, weather conditions, road conditions, or other characteristics that may be associated with each potential takeover location. For example, the scoring system may determine a takeover complexity measure based on a function that evaluates which criteria are satisfied or not. As another example, the scoring system may determine a takeover complexity measure based on a function that evaluates difficulty rankings associated with the criteria. As a further example, the scoring system may determine a takeover complexity based on machine learning as described herein. In some embodiments, the information obtained from the complexity scoring system to determine a takeover complexity measure may be used to supplement any existing takeover complexity measures.

In some embodiments, the takeover complexity measure is determined with respect to a segment of a road (or path) including a potential takeover location, such as by a sliding window method of analysis. For example, command module 230 may determine takeover complexity beginning at a potential takeover location to a pre-determined distance thereafter, which may be adjusted based on vehicle speed or other factors. In some embodiments, command module 230 may determine takeover complexity with respect to a point before a takeover location to a pre-determined distance after the takeover location, both of which may be adjusted based on vehicle speed or other factors. For example, by using a point before a takeover location in determining takeover complexity (e.g., 100 feet before a takeover location), command module 230 may avoid generating a takeover request when a vehicle operator may still be recovering from the presence of a high complexity environment preceding a takeover location (e.g., stop-and-go traffic).

In some embodiments, based on a takeover complexity measure of each potential takeover location, command module 230 may select one or more preferred takeover locations. For example, in some embodiments command module 230 may only select a preferred takeover location if the categorization encoded in a takeover complexity measure satisfies a set of conditions (e.g., with respect to speed limits, average vehicle speeds, number of lanes, road type, road geometry, intersection type, traffic control operations, traffic conditions, weather conditions, road conditions, or other characteristics). For example, a command module 230 may be instructed to only select a preferred takeover location if the takeover complexity categorizes it as "low-speed", "no curve". As another example, in some embodiments command module 230 may only select a preferred takeover location if the ranking encoded in a takeover complexity measure satisfies a set of conditions (e.g., road geometry ranking below a road geometry threshold, a speed limit ranking below a speed limit threshold).

In some embodiments, command module 230 may calculate takeover complexity along a path between vehicle 100 and a potential disengagement event, which may then be used to determine one or more preferred takeover locations based on one or more criteria (e.g., locations with a takeover complexity below a threshold, locations with a takeover complexity below a threshold at "low speed", locations with a takeover complexity below a threshold and at least five miles after a first preferred takeover location).

Figure 4:
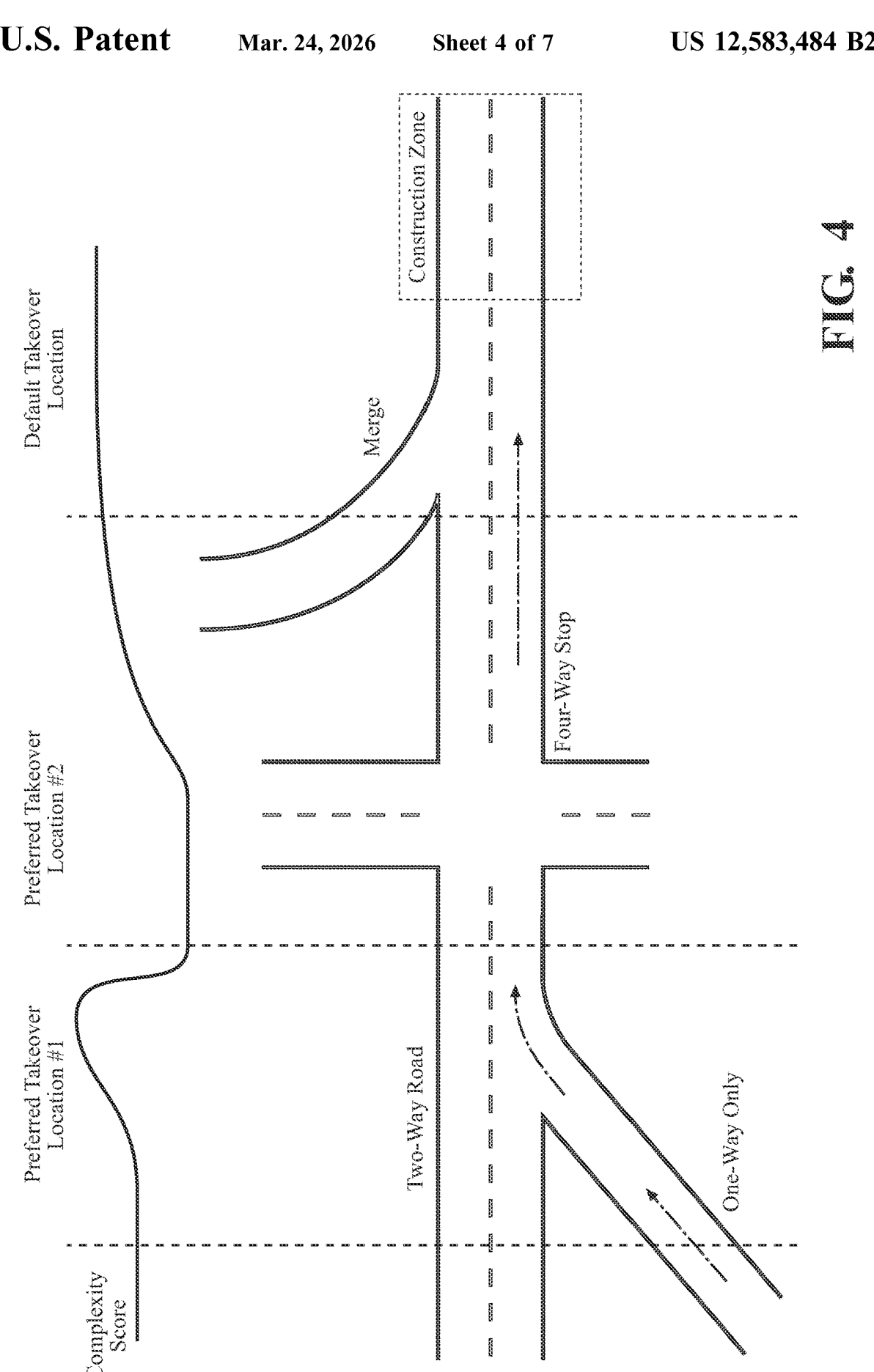
FIG. 4 illustrates one example of implementing low complexity takeover request locations.

With respect to FIG. 4, an example is shown where command module 230 receives a potential disengagement event indicating that automated driving assistance will not be available in a construction zone shortly after a road merger. In such an example, command module 230 may determine a default takeover location where a takeover request may occur (e.g., 15 seconds before entering the construction zone). However, the determination of a default takeover location may yield a result whose complexity is undesirable. For example, as shown in FIG. 4, the default takeover location may be just prior to the road merger where traffic congestion is likely to be high. Accordingly, in such an example, command module 230 may determine one or more preferred takeover locations as shown in FIG. 4 that may achieve a less complex environment for the vehicle operator to successfully respond to a takeover request. For example, command module 230 may find that a first preferred takeover location exists on a one-way side street with a low-speed limit. In addition, command module 230 may select a second preferred location should the vehicle operator not take advantage of the first preferred takeover location, where the second preferred takeover location is a four-way stop intersection. Accordingly, with respect to the example shown in FIG. 4, command module 230 may provide a vehicle operator with two opportunities prior to the default takeover location to takeover vehicle control, where such opportunities are estimated to provide a low-complexity environment.

In some embodiments, command module 230 may adjust its determination of a preferred takeover location based on a measure of operator vigilance contained within sensor data 250. For example, the lower measure of operator vigilance, the more emphasis command module 230 may place on selecting preferred takeover locations with the lowest possible measure of complexity.

In some embodiments, command module 230 may determine a post-takeover complexity measure. A post-takeover complexity measure may be used by command module 230 to indicate to a vehicle operator the expected complexity of the operating environment after a takeover occurs. In some embodiments, the post-takeover complexity measure may be determined using the same approach as determining a takeover complexity. For example, a post-takeover complexity measure may be evaluated the same as takeover complexity measure at a post-takeover location.

In some embodiments, the post-takeover complexity measure is determined with respect to a segment of a road (or path) including a post-takeover location, such as by a sliding window method of analysis. For example, command module 230 may determine post-takeover complexity beginning at a post-takeover location to a pre-determined post-takeover distance thereafter, which may be adjusted based on vehicle speed or other factors. In some embodiments, command module 230 may determine takeover complexity with respect to a point before a post-takeover location to a pre-determined post-takeover distance after the post-takeover location, both of which may be adjusted based on vehicle speed or other factors. In some embodiments, command module 230 may determine post-takeover complexity with respect to a point after a post-takeover location to a pre-determined post-takeover distance after the post-takeover location, both of which may be adjusted based on vehicle speed or other factors.

In some embodiments, command module 230 may generate a takeover request at a preferred takeover location or a default takeover location. For example, command module 230 may issue a notification using visual, auditory, haptic, or other means indicating to the vehicle operator that he or she should take over control of the vehicle. In some embodiments, the takeover request may display one or more preferred takeover locations when presenting a takeover request. In some embodiments, the takeover request may also display the default takeover location (e.g., should the preferred takeover locations be ignored). In some embodiments, such as if a takeover does not occur with respect to a first preferred takeover location, a notification may be provided by command module 230 to the vehicle operator of when or where the next preferred takeover location or default takeover location will occur. In some embodiments, a takeover request related to a preferred takeover location may differ in terms of intensity of the notification from a takeover request related to a default takeover location. For example, a takeover request related to a preferred takeover location may be issued with gentle tones with a soothing voice instruction, while a takeover request related to a default takeover location may be issued with abrasive tones and an urgent voice instruction.

In some embodiments, command module 230 may generate a notification based on a post-takeover complexity measure. For example, command module 230 may issue a notification using visual, auditory, haptic, or other means indicating to a vehicle operator the expected complexity of the operating environment after a takeover occurs. In some embodiments, the post-takeover complexity notification may be provided before, along with, or after a takeover request. In some embodiments, command module 230 may have a set of post-takeover instructions to be used with specific post-takeover complexity measures. For example, if the categorization encoded in a post-takeover complexity measure indicates a sharp right turn after the takeover, such an encoding may be associated with a post-takeover instruction (e.g., "please prepare for a sharp right turn", "best to reduce speed to under 40 mph"). As another example, if the takeover complexity measure is above a threshold, this may result in a warning (e.g., "please prepare for heavy traffic"). As yet another example, post-takeover instructions may suggest to the vehicle operator whether to engage or adjust vehicle functions (e.g., enable all-wheel drive, switch to regular mode from sport mode) that may be undertaken by the vehicle operator to better address the expected complexity. In some embodiments, as part of the post-takeover complexity notification command module 230 may provide a post-takeover instruction based on a post-takeover complexity measure.

Figure 5:
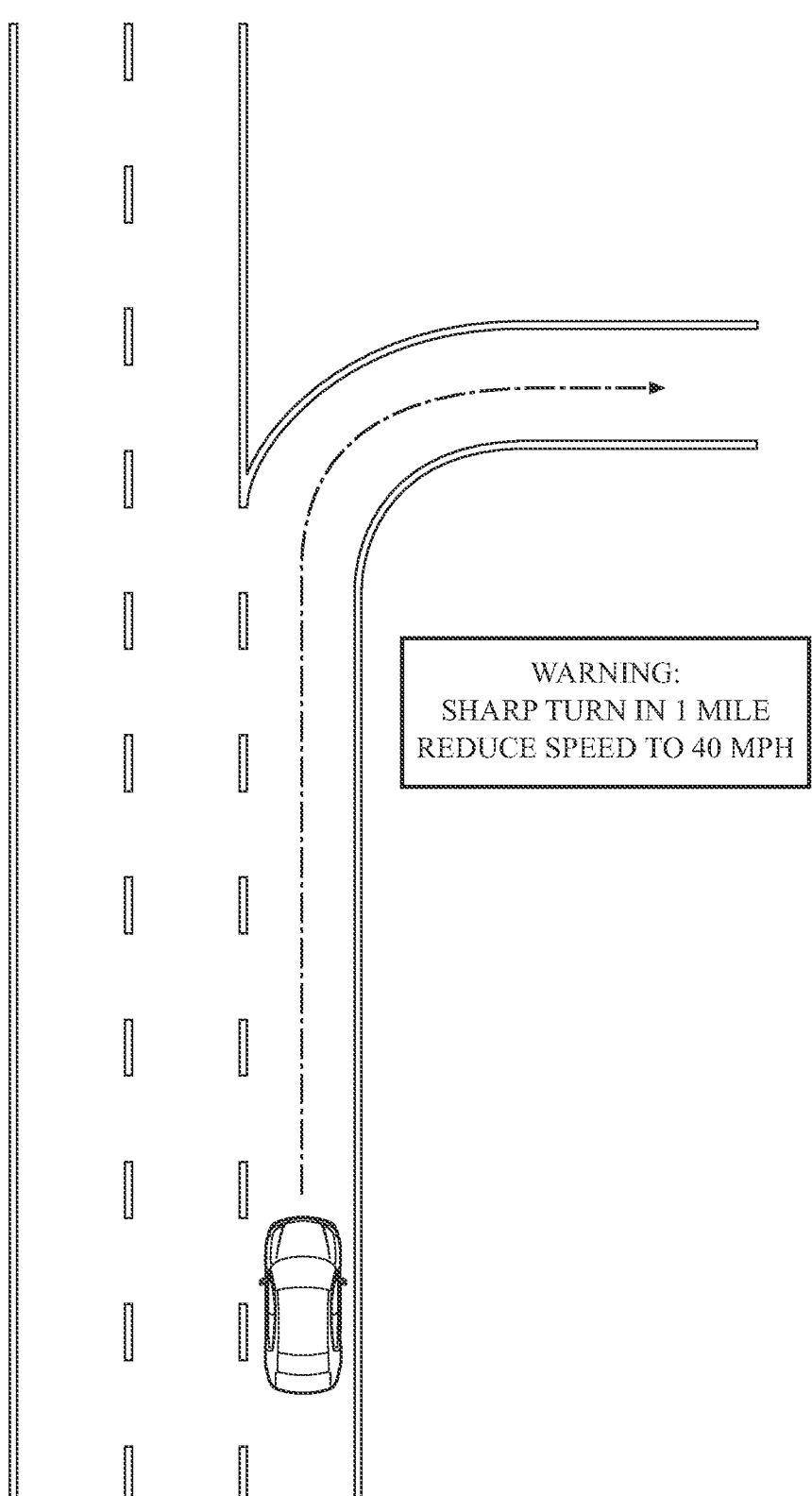
FIG. 5 illustrates one example of displaying a post-takeover complexity notification.

With respect to FIG. 5, an example is shown where command module 230 displays a notification based on a post-takeover complexity measure. In such an example, command module 230 may have determined that an exit lane prior to a highway off-ramp was a preferred takeover location. Accordingly, command module 230 may issue a notification that the vehicle operator please resume manual control. In addition, command module 230 as shown in FIG. 5 may determine based on the post-takeover complexity measure of the off-ramp that a post-takeover complexity notification, including post-takeover instructions, be presented along with the takeover request. Accordingly, in such an example not only is the vehicle operator provided a low-complexity environment to take over manual control, but also given adequate warning of a significant change in complexity ahead of the vehicle.

It should be appreciated that the command module 230 in combination with a prediction model 270 can form a computational model such as a machine learning logic, deep learning logic, a neural network model, or another similar approach. In one embodiment, the prediction model 270 is a statistical model such as a regression model that determines takeover complexity measures or preferred takeover locations based on sensor data 250, map data 116, or other sources of information as described herein. Accordingly, the model 270 can be a polynomial regression (e.g., least weighted polynomial regression), least squares or another suitable approach.

Moreover, in alternative arrangements, the prediction model 270 is a probabilistic approach such as a hidden Markov model. In either case, the command module 230, when implemented as a neural network model or another model, in one embodiment, electronically accepts the sensor data 250 as an input, which may also include evaluation metrics. Accordingly, the command module 230 in concert with the prediction model 270 produce various determinations/assessments as an electronic output that characterizes the noted aspect as, for example, a single electronic value. Moreover, in further aspects, the takeover evaluator system 170 can collect the noted data, log responses, and use the data and responses to subsequently further train the model 270.

Figure 6:
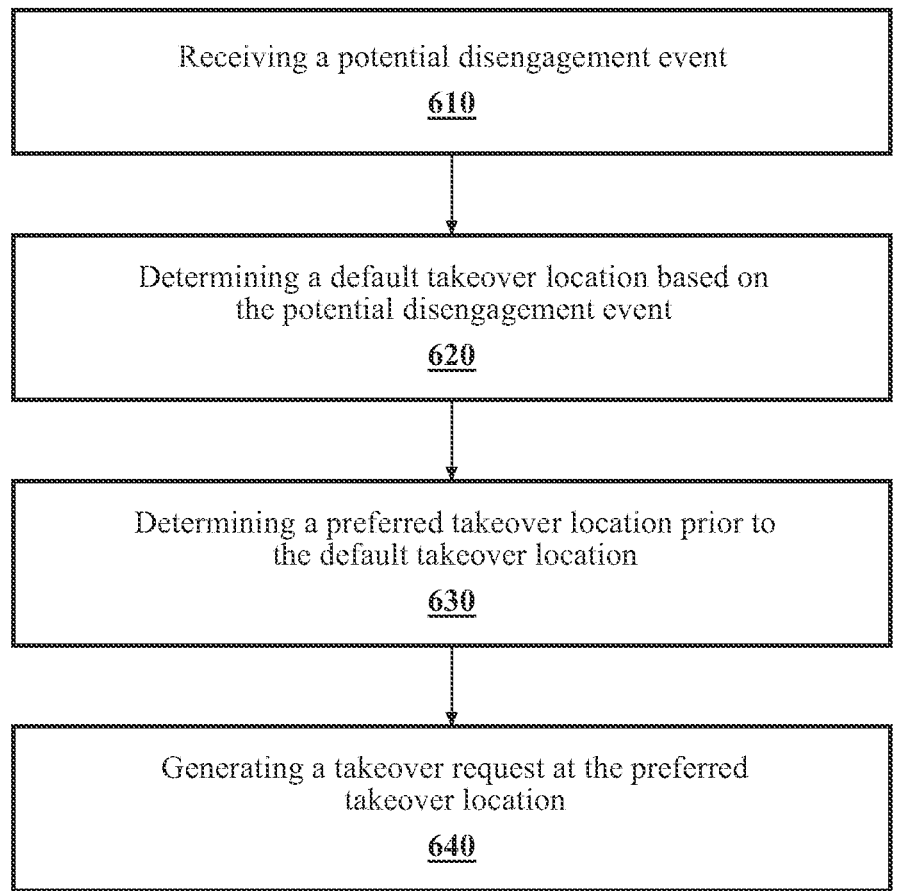
FIG. 6 illustrates one embodiment of a method for using a takeover evaluator system for implementing low complexity takeover request locations.

Additional aspects of evaluating takeover complexity will be discussed in relation to FIG. 6. FIG. 6 illustrates a flowchart of a method 600 that is associated with evaluating takeover complexity. Method 600 will be discussed from the perspective of the takeover evaluator system 170 of FIGS. 1 and 2. While method 600 is discussed in combination with the takeover evaluator system 170, it should be appreciated that the method 600 is not limited to being implemented within the takeover evaluator system 170 but is instead one example of a system that may implement the method 600.

At 610, command module 230 may receive a potential disengagement event. In some embodiments, command module 230 may receive a potential disengagement event based on where map data 116 specifies areas limiting or prohibiting automated driving assistance. In some embodiments, command module 230 may receive a potential disengagement event via network 305. In some embodiments, command module 230 may receive a potential disengagement event based on weather conditions, such as where expected fog, rain, or snow at a location ahead is expected to cause difficulties with camera-based automated driving assistance. In some embodiments, command module 230 may receive a potential disengagement event based on traffic conditions, such as where expected traffic congestion at a location ahead may impair the ability to provide automated driving assistance. In some embodiments, command module 230 may receive a potential disengagement event based on the vehicle being predicted to exit an operational design domain. In some embodiments, command module 230 may receive a potential disengagement event based on a prediction of where the vehicle will be if a time-based constraint disables automated driving assistance.

At 620, command module 230 may determine a default takeover location based on the potential disengagement event. For example, based on the potential disengagement event, command module 230 may determine where the default takeover location should occur (e.g., so as to satisfy a minimum required amount of time for allowing a takeover to occur after a takeover request and prior to a potential disengagement). In some embodiments, the default takeover location may be established with respect to a reference point and a specific amount of time in relation to encountering the reference point (e.g., 15 seconds before point A, 10 seconds after point B). In some embodiments, command module 230 may adjust the default takeover location, including the location of a reference point or the specific amount of time in relation to the reference point, based on vehicle speed or other vehicle parameters, including vehicle estimates of operator vigilance. In some embodiments, the default takeover location may be adjusted based on vehicle speed to ensure sufficient time for a takeover process to complete prior to a potential disengagement. In some embodiments, command module 230 may determine a default takeover location only if the vehicle operator fails to properly respond to a takeover request associated with a preferred takeover location. In some embodiments, a default takeover location may be determined in the same manner as a preferred takeover location.

At 630, command module 230 may determine a preferred takeover location prior to the default takeover location. In some embodiments, based on a takeover complexity measure of each potential takeover location, command module 230 may select one or more preferred takeover locations. For example, in some embodiments command module 230 may only select a preferred takeover location if the categorization encoded in a takeover complexity measure satisfies a set of conditions (e.g., with respect to speed limits, average vehicle speeds, number of lanes, road type, road geometry, intersection type, traffic control operations, traffic conditions, weather conditions, road conditions, or other characteristics). For example, a command module 230 may be instructed to only select a preferred takeover location if the takeover complexity categorizes it as "low-speed", "no curve". As another example, in some embodiments command module 230 may only select a preferred takeover location if the ranking encoded in a takeover complexity measure satisfies a set of conditions (e.g., road geometry ranking below a road geometry threshold, a speed limit ranking below a speed limit threshold).

At 640, command module 230 may generate a takeover request at the preferred takeover location. In some embodiments, command module 230 may issue a notification using visual, auditory, haptic, or other means indicating to the vehicle operator that he or she should take over control of the vehicle. In some embodiments, the takeover request may display one or more preferred takeover locations when presenting a takeover request. In some embodiments, the takeover request may also display the default takeover location (e.g., should the preferred takeover locations be ignored). In some embodiments, such as if a takeover does not occur with respect to a first preferred takeover location, a notification may be provided by command module 230 to the vehicle operator of when or where the next preferred takeover location or default takeover location will occur. In some embodiments, a takeover request related to a preferred takeover location may differ in terms of intensity of the notification from a takeover request related to a default takeover location. For example, a takeover request related to a preferred takeover location may be issued with gentle tones with a soothing voice instruction, while a takeover request related to a default takeover location may be issued with abrasive tones and an urgent voice instruction.

Figure 7:
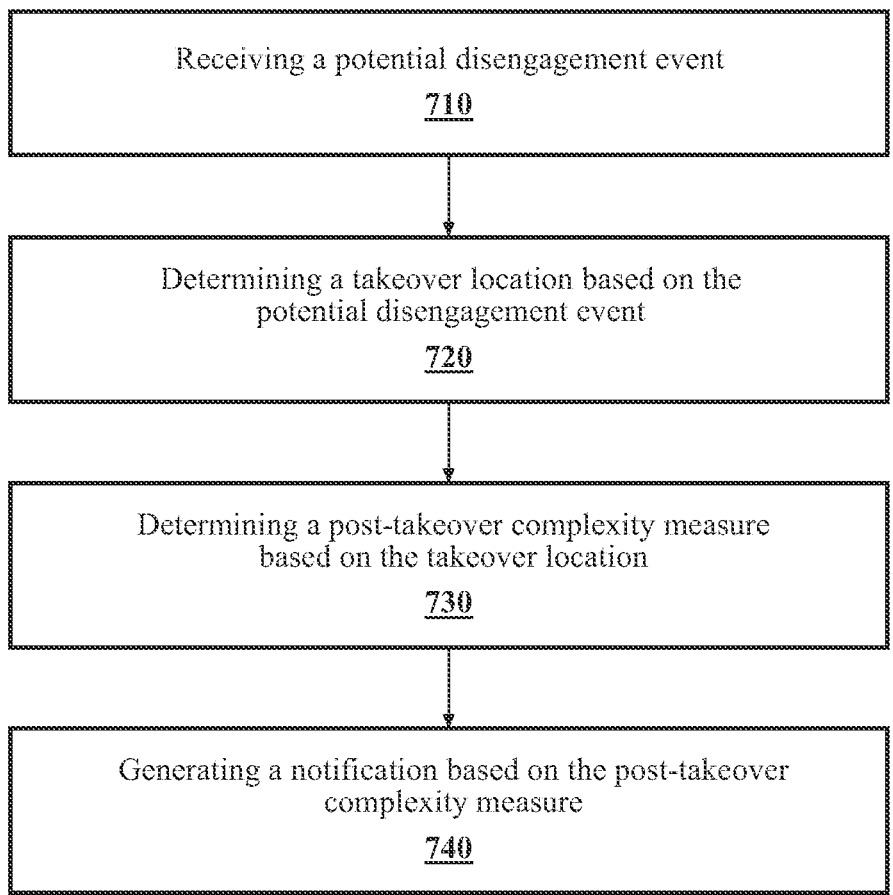
FIG. 7 illustrates one embodiment of a method for using a takeover evaluator system for providing post-takeover complexity notifications.

Additional aspects of evaluating takeover complexity will be discussed in relation to FIG. 7. FIG. 7 illustrates a flowchart of a method 700 that is associated with evaluating takeover complexity. Method 700 will be discussed from the perspective of the takeover evaluator system 170 of FIGS. 1 and 2. While method 700 is discussed in combination with the takeover evaluator system 170, it should be appreciated that the method 700 is not limited to being implemented within the takeover evaluator system 170 but is instead one example of a system that may implement the method 700.

At 710, command module 230 may receive a potential disengagement event. In some embodiments, command module 230 may receive a potential disengagement event based on where map data 116 specifies areas limiting or prohibiting automated driving assistance. In some embodiments, command module 230 may receive a potential disengagement event via network 305. In some embodiments, command module 230 may receive a potential disengagement event based on weather conditions, such as where expected fog, rain, or snow at a location ahead is expected to cause difficulties with camera-based automated driving assistance. In some embodiments, command module 230 may receive a potential disengagement event based on traffic conditions, such as where expected traffic congestion at a location ahead may impair the ability to provide automated driving assistance. In some embodiments, command module 230 may receive a potential disengagement event based on the vehicle being predicted to exit an operational design domain. In some embodiments, command module 230 may receive a potential disengagement event based on a prediction of where the vehicle will be if a time-based constraint disables automated driving assistance.

At 720, command module 230 may determine a takeover location based on the potential disengagement event. In some embodiments, command module 230 may determine a default takeover location based on the potential disengagement event. For example, based on the potential disengagement event, command module 230 may determine where the default takeover location should occur (e.g., so as to satisfy a minimum required amount of time for allowing a takeover to occur after a takeover request and prior to a potential disengagement). In some embodiments, the default takeover location may be established with respect to a reference point and a specific amount of time in relation to encountering the reference point (e.g., 15 seconds before point A, 10 seconds after point B). In some embodiments, command module 230 may adjust the default takeover location, including the location of a reference point or the specific amount of time in relation to the reference point, based on vehicle speed or other vehicle parameters, including vehicle estimates of operator vigilance. In some embodiments, the default takeover location may be adjusted based on vehicle speed to ensure sufficient time for a takeover process to complete prior to a potential disengagement. In some embodiments, command module 230 may determine a default takeover location only if the vehicle operator fails to properly respond to a takeover request associated with a preferred takeover location. In some embodiments, a default takeover location may be determined in the same manner as a preferred takeover location.

In some embodiments, command module 230 may determine a preferred takeover location prior to the default takeover location. In some embodiments, based on a takeover complexity measure of each potential takeover location, command module 230 may select one or more preferred takeover locations. For example, in some embodiments command module 230 may only select a preferred takeover location if the categorization encoded in a takeover complexity measure satisfies a set of conditions (e.g., with respect to speed limits, average vehicle speeds, number of lanes, road type, road geometry, intersection type, traffic control operations, traffic conditions, weather conditions, road conditions, or other characteristics). For example, a command module 230 may be instructed to only select a preferred takeover location if the takeover complexity categorizes it as "low-speed", "no curve". As another example, in some embodiments command module 230 may only select a preferred takeover location if the ranking encoded in a takeover complexity measure satisfies a set of conditions (e.g., road geometry ranking below a road geometry threshold, a speed limit ranking below a speed limit threshold).

At 730, command module 230 may determine a post-takeover complexity measure based on the takeover location. For example, a post-takeover complexity measure may be evaluated the same as takeover complexity measure at a post-takeover location. In some embodiments, command module 230 may determine a post-takeover complexity measure based on speed limits or average vehicle speeds; the number of lanes or changes in the number of lanes; road type; road geometry; intersection type; traffic control operations; traffic conditions; weather conditions; road conditions; or other conditions after the post-takeover location according to one or more criteria. In some embodiments, a post-takeover complexity measure may be measured in terms of categorization. In some embodiments, a post-takeover complexity measure may be characterized according to a ranking of the criteria in terms of difficulty.

In some embodiments, command module 230 may implement a complexity scoring system to determine a post-takeover complexity measure. Such a complexity scoring system may have one or more criteria for evaluating a post-takeover complexity measure with respect to speed limits, average vehicle speeds, number of lanes, road type, road geometry, intersection type, traffic control operations, traffic conditions, weather conditions, road conditions, or other characteristics that may be associated with the post-takeover location. For example, the scoring system may determine a post-takeover complexity measure based on a function that evaluates which criteria are satisfied or not. As another example, the scoring system may determine a post-takeover complexity measure based on a function that evaluates difficulty rankings associated with the criteria. As a further example, the scoring system may determine a post-takeover complexity based on machine learning as described herein. In some embodiments, the information obtained from the complexity scoring system to determine a post-takeover complexity measure may be used to supplement any existing post-takeover complexity measures.

In some embodiments, the post-takeover complexity measure is determined with respect to a segment of a road (or path) including a post-takeover location, such as by a sliding window method of analysis. For example, command module 230 may determine post-takeover complexity beginning at a post-takeover location to a pre-determined post-takeover distance thereafter, which may be adjusted based on vehicle speed or other factors. In some embodiments, command module 230 may determine takeover complexity with respect to a point before a post-takeover location to a pre-determined post-takeover distance after the post-takeover location, both of which may be adjusted based on vehicle speed or other factors. In some embodiments, command module 230 may determine post-takeover complexity with respect to a point after a post-takeover location to a pre-determined post-takeover distance after the post-takeover location, both of which may be adjusted based on vehicle speed or other factors.

At 740, command module 230 may generate a notification based on the post-takeover complexity measure. For example, command module 230 may issue a notification using visual, auditory, haptic, or other means indicating to a vehicle operator the expected complexity of the operating environment after a takeover occurs. In some embodiments, the post-takeover complexity notification may be provided before, along with, or after a takeover request. In some embodiments, command module 230 may have a set of post-takeover instructions to be used with specific post-takeover complexity measures. For example, if the categorization encoded in a post-takeover complexity measure indicates a sharp right turn after the takeover, such an encoding may be associated with a post-takeover instruction (e.g., "please prepare for a sharp right turn"). As another example, if the takeover complexity measure is above a threshold, this may result in a warning (e.g., "please prepare for heavy traffic"). In some embodiments, as part of the post-takeover complexity notification command module 230 may provide a post-takeover instruction based on a post-takeover complexity measure.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more acceler-ometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, cross-walks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrange-ments, the one or more cameras 126 can be high dynamic range (HDR) cameras or infrared (IR) cameras.

The vehicle 100 can include an input system 130. An "input system" includes any device, component, system, element or arrangement or groups thereof that enable infor-mation/data to be entered into a machine. The input system 130 can receive an input from a vehicle passenger (e.g., a driver or a passenger). The vehicle 100 can include an output system 135. An "output system" includes any device, com-ponent, or arrangement or groups thereof that enable infor-mation/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hard-ware and/or software within the vehicle 100. The vehicle 100 can include a propulsion system 141, a braking system 142, a steering system 143, throttle system 144, a transmis-sion system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the takeover evaluator system 170, and/or the automated driving module(s) 160 can be opera-tively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the takeover evaluator system 170, and/or the auto-mated driving module(s) 160 may control some or all of these vehicle systems 140 and, thus, may be partially or fully autonomous.

The processor(s) 110, the takeover evaluator system 170, and/or the automated driving module(s) 160 can be opera-tively connected to communicate with the various vehicle systems 140 and/or individual components thereof. For example, returning to FIG. 1, the processor(s) 110, the takeover evaluator system 170, and/or the automated driving module(s) 160 can be in communication to send and/or receive information from the various vehicle systems 140 to control the movement, speed, maneuvering, heading, direc-tion, etc. of the vehicle 100. The processor(s) 110, the takeover evaluator system 170, and/or the automated driving module(s) 160 may control some or all of these vehicle systems 140.

The processor(s) 110, the takeover evaluator system 170, and/or the automated driving module(s) 160 may be oper-able to control the navigation and/or maneuvering of the vehicle 100 by controlling one or more of the vehicle systems 140 and/or components thereof. For instance, when operating in an autonomous mode, the processor(s) 110, the takeover evaluator system 170, and/or the automated driving module(s) 160 can control the direction and/or speed of the vehicle 100. The processor(s) 110, the takeover evaluator system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to respon-sive to receiving signals or other inputs from the processor(s) 110 and/or the automated driving module(s) 160. Any suitable actuator can be used. For instance, the one or more actuators 150 can include motors, pneumatic actua-tors, hydraulic pistons, relays, solenoids, and/or piezoelec-tric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the takeover evaluator system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
    detect a potential disengagement event where automated driving would be disabled;
    determine a takeover location based on the potential disengagement event;
    determine a takeover complexity measure based on a first segment from the takeover location to a speed-adjustable pre-determined distance after the takeover location;
    determine a post-takeover complexity measure based on a second segment after the first segment; and
    provide via a vehicle a notification based on the post-takeover complexity measure.

2. The system of claim 1, wherein the notification includes the post-takeover complexity measure.

3. The system of claim 2, wherein the notification includes post-takeover instructions.

4. The system of claim 3, wherein the notification occurs with a takeover request.

5. The system of claim 1, wherein the first segment further includes from a pre-takeover location to the takeover location.

6. The system of claim 1, wherein the second segment includes from a post-takeover location to a second speed-adjustable pre-determined distance after the post-takeover location.

7. The system of claim 1, wherein the first segment and the second segment are non-contiguous.

8. A non-transitory computer-readable medium including instructions that when executed by one or more processors cause the one or more processors to:
    detect a potential disengagement event where automated driving would be disabled;
    determine a takeover location based on the potential disengagement event;
    determine a takeover complexity measure based on a first segment from the takeover location to a speed-adjustable pre-determined distance after the takeover location;
    determine a post-takeover complexity measure based on a second segment after the first segment; and
    provide via a vehicle a notification based on the post-takeover complexity measure.

9. The non-transitory computer-readable medium of claim 8, wherein the notification includes the post-takeover complexity measure.

10. The non-transitory computer-readable medium of claim 9, wherein the notification includes post-takeover instructions.

11. The non-transitory computer-readable medium of claim 10, wherein the notification occurs with a takeover request.

12. The non-transitory computer-readable medium of claim 8, wherein the first segment and the second segment are non-contiguous.

13. A method, comprising:
    detecting a potential disengagement event where automated driving would be disabled;
    determining a takeover location based on the potential disengagement event;

determining a takeover complexity measure based on a first segment from the takeover location to a speed-adjustable pre-determined distance after the takeover location;

determining a post-takeover complexity measure based on a second segment after the first segment; and providing via a vehicle a notification based on the post-takeover complexity measure.

14. The method of claim 13, wherein the notification includes the post-takeover complexity measure.

15. The method of claim 14, wherein the notification includes post-takeover instructions.

16. The method of claim 15, wherein the notification occurs with a takeover request.

17. The method of claim 13, wherein the first segment further includes from a pre-takeover location to the takeover location.

18. The method of claim 13, wherein the second segment includes from a post-takeover location to a second speed-adjustable pre-determined distance after the post-takeover location.

19. The method of claim 13, wherein the first segment and the second segment are non-contiguous.

20. The non-transitory computer-readable medium of claim 8, wherein the first segment includes a preferred takeover location and the second segment includes a default takeover location.

* * * * *